(12) United States Patent
Glaser et al.

(10) Patent No.: US 8,882,136 B2
(45) Date of Patent: Nov. 11, 2014

(54) SIDE PANELING SYSTEM

(71) Applicant: GM Global Technology Operations LLC, Detroit, MI (US)

(72) Inventors: Carsten Glaser, Muehltal (DE); Thorsten Best, Bechtolsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/712,469

(22) Filed: Dec. 12, 2012

(65) Prior Publication Data
US 2013/0154243 A1    Jun. 20, 2013

(30) Foreign Application Priority Data
Dec. 15, 2011    (DE) .......................... 10 2011 121 266

(51) Int. Cl.
| | |
|---|---|
| *B60R 21/216* | (2011.01) |
| *B62D 65/02* | (2006.01) |
| *B60R 13/02* | (2006.01) |
| *B60R 21/213* | (2011.01) |

(52) U.S. Cl.
CPC .............. *B60R 21/216* (2013.01); *B62D 65/02* (2013.01); *B60R 13/0206* (2013.01); *B60R 21/213* (2013.01)
USPC ..................................... 280/728.3; 280/730.2

(58) Field of Classification Search
USPC ............................................ 280/728.3, 730.2
See application file for complete search history.

(56) References Cited

U.S. PATENT DOCUMENTS

| | | | |
|---|---|---|---|
| 6,145,870 A | 11/2000 | Devane et al. | |
| 6,254,123 B1 | 7/2001 | Urushi et al. | |
| 6,402,188 B1 * | 6/2002 | Pasch ......................... | 280/728.2 |
| 6,863,300 B2 * | 3/2005 | Ryu ........................... | 280/730.2 |
| 7,178,205 B2 * | 2/2007 | Nessel et al. .................... | 24/289 |
| 7,793,972 B2 * | 9/2010 | Downey ....................... | 280/728.3 |
| 7,832,064 B2 * | 11/2010 | Nessel et al. .................... | 24/297 |
| 7,871,103 B2 * | 1/2011 | Torii ........................... | 280/728.2 |

(Continued)

FOREIGN PATENT DOCUMENTS

| | | |
|---|---|---|
| DE | 102007027323 A1 | 12/2008 |
| DE | 102008006905 A1 | 8/2009 |

(Continued)

OTHER PUBLICATIONS

Intellectual Property Office, Search Report under Section 17 for United Kingdom Application No. GB1221986.1, issued Apr. 5, 2013.

*Primary Examiner* — Nicole Verley
(74) *Attorney, Agent, or Firm* — Ingrassia Fisher & Lorenz, P.C.

(57) ABSTRACT

A side paneling system for a pillar of a motor vehicle is provided. The system includes a side paneling part for covering the pillar and an airbag arranged between the side paneling part and the pillar, at least one connecting element for releasably connecting the side paneling part to the pillar so that with an airbag (10) activating itself the side paneling part can move away from the pillar with the airbag, a catch band that is indirectly or directly connected to the side paneling part, so that the side paneling part is indirectly or directly fastened to the pillar with the catch band even with an activated airbag and the released connecting element. The side paneling part is in two parts with a first part and a second part, so that only the second part can move away from the pillar with the airbag.

20 Claims, 3 Drawing Sheets

(56) References Cited

U.S. PATENT DOCUMENTS

| | | | |
|---|---|---|---|
| 8,439,393 B2* | 5/2013 | Glaser | 280/728.2 |
| 2004/0094938 A1* | 5/2004 | Ryu | 280/730.2 |
| 2007/0222192 A1 | 9/2007 | Yamagiwa et al. | |
| 2010/0025938 A1 | 2/2010 | Berdichevsky et al. | |
| 2010/0025973 A1 | 2/2010 | Jang et al. | |
| 2011/0248480 A1 | 10/2011 | Glaser | |

FOREIGN PATENT DOCUMENTS

| | | |
|---|---|---|
| DE | 102010014051 A1 | 10/2011 |
| EP | 1087879 A1 | 4/2001 |
| JP | 3499465 B2 | 2/2004 |
| JP | 2010047135 A | 3/2010 |
| JP | 2010052604 A | 3/2010 |
| JP | 2010254105 A | 11/2010 |
| KR | 100809635 B1 | 3/2008 |

* cited by examiner

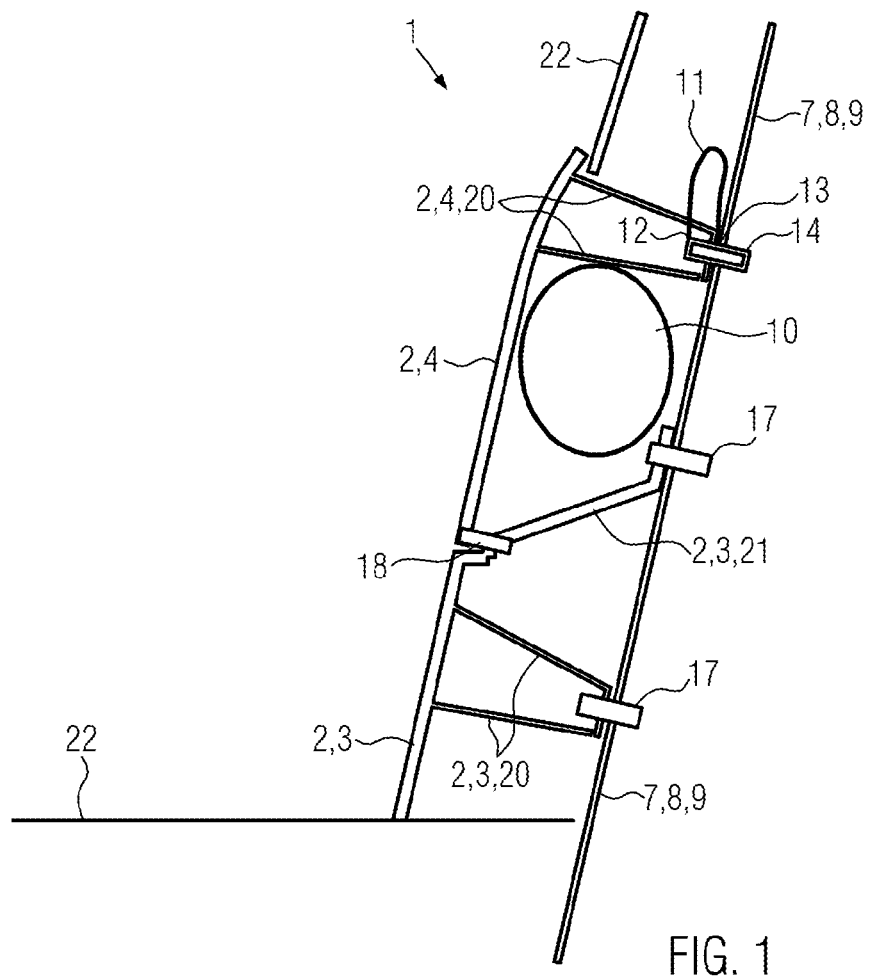
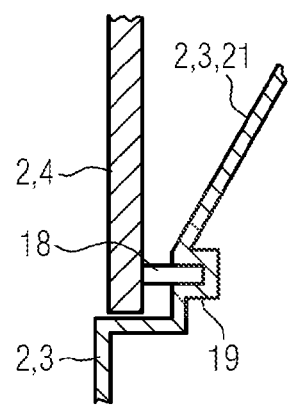

SIDE PANELING SYSTEM

CROSS-REFERENCE TO RELATED APPLICATIONS

This application claims priority to German Patent Application No. 10 2011 121 266.7, filed Dec. 15, 2011, which is incorporated herein by reference in its entirety.

TECHNICAL FIELD

This application pertains to a side paneling system, a method for producing a motor vehicle and motor vehicle.

BACKGROUND

In motor vehicles, head airbags are employed in order to protect occupants during an accident. Here, the head airbag is arranged between an A and C-pillar of the motor vehicle on a side part of the body. In the non-activated state, the airbag is thus arranged between the interior paneling and the body. A gas generator above a B-pillar within a gas generator housing activates and inflates the airbag during an accident. Here, the head airbag is also run as far as to a C-pillar, so that during activating and inflating of the airbag the interior paneling on the C-pillar, i.e. a side paneling part on the C-pillar, is detached from the C-pillar by the airbag activating itself. To this end, the side paneling part is connected to the pillar with releasable connecting elements so that the releasable connecting elements are released by the airbag activating itself and the side paneling parts can be moved away from the pillar because of this. In order to prevent further uncontrolled moving on the released side paneling part, this is connected to the pillar with a catch band in a disadvantageous manner, the entire side paneling is thus released from the D-pillar after the activating of the airbag.

EP 1 087 879 B1 shows a restraining device for a paneling part of the interior paneling of a motor vehicle covering an airbag arrangement, with which the paneling part during the opening-up of the airbag detaches itself from the restraining device and because of this makes possible a free opening-up of the airbag in an accident situation, wherein the restraining device comprises a fastening element designed as spring-elastic clip which is releasably fastened to the carcass of the motor vehicle, and a holding element connected to the spring-elastic clip, which releasably holds the paneling part in a tight manner, and a catch band limiting the movement of the paneling part is provided, which on the one hand is attached to the paneling part, wherein the catch band on the other hand comprises an elongated hole, through which the spring-elastic clip releasably fastened to the carcass of the motor vehicle engages, wherein the catch band is secured on the spring-elastic clip through the holding element.

In addition, other objects, desirable features and characteristics will become apparent from the subsequent summary and detailed description, and the appended claims, taken in conjunction with the accompanying drawings and this background.

SUMMARY

The various aspects of the present disclosure provides a side paneling system, a method for producing a motor vehicle and a motor vehicle, with which the side paneling on a pillar is partially retained unchanged with an activated and triggered airbag.

In one exemplary embodiment, provided is a side paneling system for a pillar of a motor vehicle, comprising a side paneling part for covering the pillar and an airbag arranged between the side paneling part and the pillar, at least one connecting element for the releasable connecting of the side paneling part to the pillar, so that in the case of an airbag activating itself the side paneling part with the airbag can move away from the pillar, a catch band indirectly or directly connected to the side paneling part, so that the side paneling part is indirectly or directly fastened to the pillar with the catch band even with an activated airbag and the released connecting element, wherein the side paneling part is in two parts with a first part and a second part, so that only the second part with the airbag can move away from the pillar. The side paneling part is advantageously in two parts, so that following the activation of the airbag the first part advantageously continues to be connected to the connecting element to the pillar or vehicle structure and only the second part is no longer connected to the connecting element to the vehicle structure and merely fastened to the pillar of vehicle structure with the catch band. Because of this, only the second part is moved away from the pillar by the airbag upon the activation of the airbag. Because of this, the pillar advantageously continues to be covered by the first part even after the activation of the airbag.

In another exemplary embodiment, the side paneling system is designed such that the first part of the side paneling part after an activation of the airbag is connected to the pillar by means of the connecting element and the connection with the connecting element in the case of the second part of the side paneling part is released after the activation of the airbag and/or the first part is a lower part and the second part an upper part.

In another exemplary embodiment, the second part is indirectly or directly connected to the first part of the side paneling part by means of a releasable paneling connecting element.

In another exemplary embodiment, the releasable panel connecting element and/or the releasable connecting element is designed as a clip or engagement element, so that the releasable panel connecting element and/or the releasable connecting element can be released by means of the airbag. With the connecting element and/or with the panel connecting element, a form-fitting and/or force-fitting connection can be carried out or is present between the side paneling part and the vehicle structure. With the clip or engagement element, the second part of the side paneling part can thus be released by the airbag from the pillar and/or from the first part with low forces.

In another exemplary embodiment, exclusively at least one releasable connecting element is formed on the second part and on the first part at least one releasable connecting element or at least one non-releasable connecting element, e.g. screw or riveting element is formed, so that the non-releasable connecting element cannot be released by the airbag. A releasable connecting element and/or panel connecting element constitutes an element which can be released by the airbag activating itself and a non-releasable connecting element constitutes an element which cannot be released by the airbag activating itself. For example, for releasing a screw connection or a screw element, an unscrewing of a screw is required and this cannot be carried out by the airbag activating and inflating itself.

In a complementary version, the first part and/or the second part of the side paneling part comprises on the inside a holding frame as constituent part of the first and/or second part.

Practically, the catch band is tightly connected a first end indirectly or directly to the second part or to a connecting element formed on the second part. With the catch band, the second part released from the pillar can thus be continuously held at a spacing on the pillar.

In another exemplary embodiment, a ramp for guiding the movement direction of the airbag activating itself is formed on the first part of the side paneling part.

In another exemplary embodiment, the first part and/or the second part and/or the at least one connecting element and/or the panel connecting element comprises at least partially, in one example, completely, plastic. The first and/or second part can thus be produced particularly easily and cost-effectively for example by means of injection molding of in one example, thermoplastic.

A method for producing a motor vehicle according to the present disclosure comprises: making available a side paneling system, fastening the side paneling system to a vehicle structure, wherein a side paneling system described in this application is made available. The two parts of the side paneling part are initially produced separately during the casting, for example injection molding from plastic, and the two parts are subsequently connected into the side paneling system with the at least one panel connecting element. Because of this, the already inter-connected parts of the side paneling part can be jointly fastened to the vehicle structure during the production of the motor vehicle.

In another exemplary embodiment, the first and second part of the side paneling part are already interconnected with the panel connecting element before the fastening of the side paneling system to the vehicle structure, so that the two parts of the side paneling part already connected with the panel connecting element are connected to the vehicle structure.

In another exemplary embodiment, the first part is directly or indirectly connected to the vehicle structure with at least one connecting element and the second part is connected indirectly or directly to the vehicle structure with at least one connecting element and/or the vehicle structure is a body, generally a pillar, in one example, an A or C-pillar. With an indirect connecting of the first part with the connecting element to the vehicle structure, at least one further component, for example an additional paneling or a mechanism is arranged between the connecting element and the vehicle structure and with a direct connecting of the first part with the connecting element to the vehicle structure, the connecting element is directly connected to the vehicle structure.

A motor vehicle according to the present disclosure having at least one side paneling system, wherein the side paneling system is designed as a side paneling system described in this application and/or the side paneling system is produced with a method described in this application.

In an additional version, the pillar is an A or C-pillar and in one example, the pillar also comprises a region of the vehicle structure, in one example, body, in the region of the pillar and/or of the airbag, a head airbag and/or between the second part of the side paneling part and the pillar, the airbag is arranged and/or between the first part of the side paneling system and the pillar, no airbag is arranged.

In another exemplary embodiment, the catch band is indirectly or directly connected with a second end to the vehicle structure, in one example, pillar and/or the second part is exclusively connected indirectly or directly to the vehicle structure, in one example, pillar with the at least one releasable connecting element and the first part is connected indirectly or directly to the vehicle structure with at least one releasable or non-releasable connecting element and/or after the activating of the airbag, the second part is only connected with the catch band indirectly or directly to the vehicle structure.

In another exemplary embodiment, the airbag, in one example, head airbag, is formed between an interior paneling and the vehicle structure, for example, a body and generally between the A and C-pillar.

In another exemplary embodiment, the motor vehicle comprises for example, a pyrotechnical gas generator and a gas generator housing within which the gas generator is arranged.

In another exemplary embodiment, the gas generator housing with the gas generator is fastened to the vehicle structure above a B-pillar of the motor vehicle.

Practically, the side paneling system is formed next to the C-pillar also in one example, on an A-pillar of the motor vehicle and on the A-pillar of the motor vehicle, the head airbag is also partially arranged between the A-pillar and the side paneling system.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 shows a section of a side paneling system before the triggering of the airbag;

FIG. 2 shows a detail view from FIG. 1

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 3:
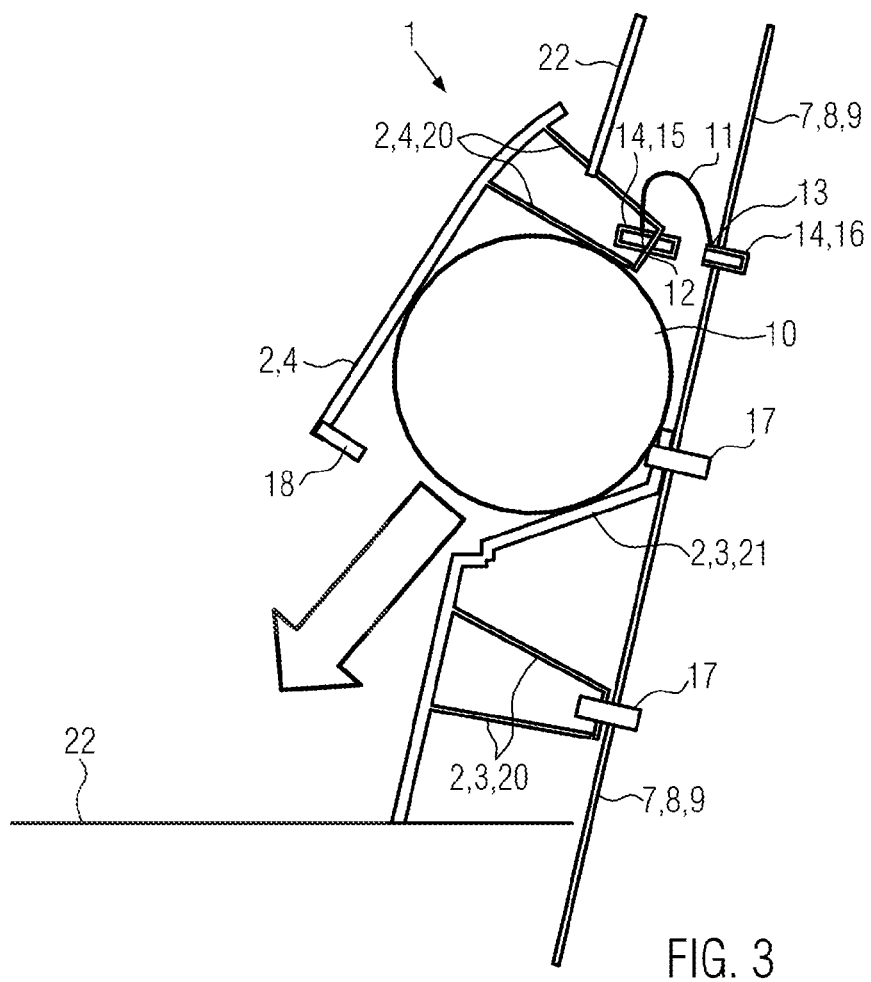
FIG. 3 shows a section of the side paneling system according to FIG. 1 after the triggering of the airbag.
Figure 4:
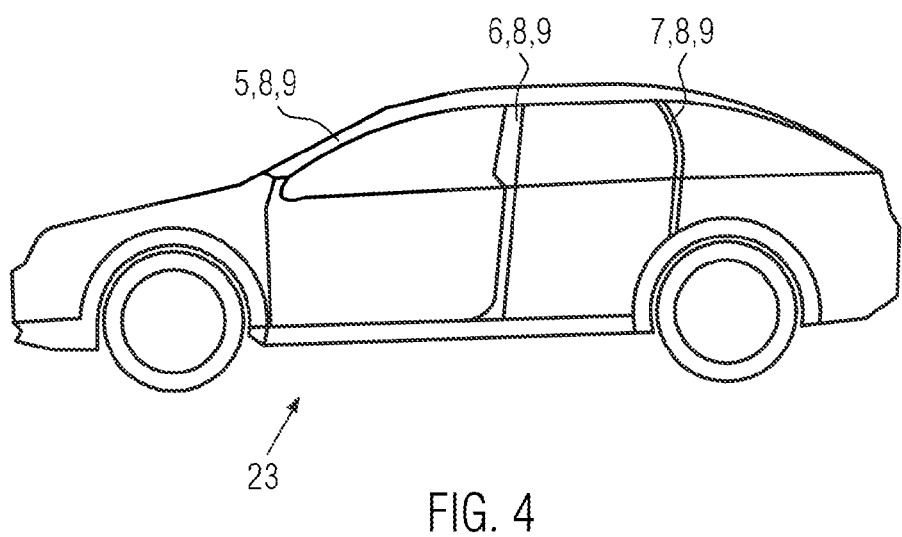
FIG. 4 shows a lateral view of a motor vehicle.

In motor vehicles 23, airbags 10 are employed as head airbags 10 in order to protect the occupants of the motor vehicle 23 from injuries during an accident. A head airbag 10 in this case is arranged above the A, B and C-pillar 5, 6, 7 on a vehicle structure 8 designed as body 9 between an interior paneling 22 and the body 9 as side part above the A, B and C-pillar 5, 6, 7. Here, the airbag 10 also reaches as far as to a C-pillar of the motor vehicle (FIGS. 1 and 3). The interior paneling 22 is formed on the C-pillar 7 as a side paneling part 2.

In addition to the side paneling part 2 for covering the C-pillar 7, a side paneling system 1 comprises connecting elements 14 for the releasable connecting of the side paneling part 2 to the C-pillar 7. The side paneling part 2 in this case is designed in two parts with a first part 3 and a second part 4 (FIGS. 1 and 3). The first part 3 of the side paneling part 2 of thermoplastic is connected to the C-pillar 7 with two releasable connecting elements 17, for example engagement or clip elements 17. In addition, a holding frame 20 is formed on the first part 2 as constituent part of the first part 3 and the two connecting elements 17 are connected to the holding frame 20 and the C-pillar at the side paneling system 1 shown in the assembled state in FIG. 1. On the first part 3, a groove 19 is additionally formed and by means of the groove 19, within which a panel connecting element 18 is arranged, the second part 4 is connected to the first part 3 (FIG. 1) by means of the panel connecting element 18. The panel connecting element 18 in this case is likewise designed as a releasable panel connecting element 18, for example as clip or engagement element 18. Additionally, the holding frame 20 is also formed on the second part 4 and with the releasable connecting element 14, the second part 4 is connected to the C-pillar 7. This means the connecting element 14 is connected both to the C-pillar 7 as well as to the holding frame 20.

With a head airbag 10 that is activating itself and is inflated by a gas generator which is not shown, the connection between thickened part 4 and the first part 3 by means of the panel connecting element 18 is released and, additionally, the connection between the holding frame 20 and the C-pillar 7 by means of the connecting element 14 is also released. This is possible without problem since both the connecting element 14 as well as the panel connecting element 18 establishes a form-fitting and/or force-fitting connection because of the design as clip or engagement element 14, 18. On the first part 3, a ramp 21 is additionally formed and the ramp 21 serves for guiding of a direction of the movement direction of the head airbag 10 during the activation of the head airbag 10. In order to prevent an uncontrolled movement of the second part 4 within the interior of the motor vehicle 23 during the activating of the head airbag 10, a catch band 11 is additionally arranged on the connecting element 14. The connecting element 14 comprises a first component 15 and a second component 16. The first component 15 is tightly connected to the holding frame 20 of the second part 4 and the second component 16 is connected to the C-pillar 7. The first and second component 15, 16 in this case are releasably interconnected, for example as clip or engagement connection. A first end 12 of the catch band 11 is tightly connected to the first component 15 and a second end 13 of the catch band 11 is tightly connected to the second component 16 of the connecting element 14. Because of this, there exists a connection between the second part 4 and the C-pillar 7 (FIG. 3) even after the activating of the airbag and the released connecting element 14 as well as the released panel connecting element 18 by means of the catch band 11. Thus, an uncontrolled movement of the second part 4 upon and after the activating of the head airbag 10 within the interior of the motor vehicle 23 can be avoided.

During the production of the motor vehicle 23, a side paneling system 1 is already made available, with which the two parts 3, 4 are interconnected by means of the panel connecting element 18. These already interconnected parts 3, 4 of the side paneling part 1 with the connecting element 14 and the connecting element 17 on the first and second part 3, 4 each can be substantially easily connected to the C-pillar 7 as a component in one operation during the assembly. The connecting elements 14, 17 in this case are designed such that these merely have to be connected to the C-pillar by means of an engaging, for example as clip or engagement element 14, 17. Because of this, the side paneling system 1 with the already interconnected parts 3, 4 can be fastened to the C-pillar 7 generally easily during the assembly.

Viewed altogether, the side paneling system 1 according to the present disclosure combines substantial advantages. The side paneling system 1 is equipped with a two-part side paneling part 2, so that after an activating of the head airbag 10 the first part 3 continues to cover the C-pillar 7 (FIG. 3) and thus continues to be connected to the C-pillar 7 by means of the connecting elements 17 and only the second part 4 is no longer connected to the C-pillar 7 with the connecting element 14. Because of this, a partial covering of C-pillar 7 with the first part 3 can also be ensured after the activating of the head airbag 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A side paneling system for a pillar of a motor vehicle, comprising:
    a side paneling part that covers the pillar;
    an airbag arranged between the side paneling part and the pillar,
    at least one connecting element that releasably connects the side paneling part to the pillar, so that upon an activation of the airbag the side paneling part with the airbag moves away from the pillar; and
    a catch band coupled to the side paneling part such that the released connecting element is coupled to the pillar with the catch band when the airbag is deployed,
    wherein the side paneling part is in two parts with a first part and a second part, so that only the second part with the airbag moves away from the pillar.

2. The side paneling system according to claim 1, wherein the first part of the side paneling part after activation of the airbag is connected to the pillar by means of a non-releasable connecting element and the connection with the releasable connecting element at the second part of the side paneling part is released after the activation of the airbag.

3. The side paneling system according to claim 2, wherein the second part is indirectly or directly connected to the first part of the side paneling part by means of a releasable panel connecting element.

4. The side paneling system according to claim 3, wherein the releasable panel connecting element is a clip or engagement element, so that the releasable panel connecting element is releasable by means of the airbag.

5. The side paneling system according to claim 4, wherein on the second part exclusively at least one releasable connecting element is formed and on the first part at least one releasable connecting element or at least one non-releasable connecting element is formed and the at least one non-releasable connecting element cannot be released by the airbag.

6. The side paneling system according to claim 5, wherein at least one of the first part and the second part of the side paneling part on the inside further comprises a holding frame as constituent part of the at least one of the first part and second part.

7. The side paneling system according to claim 6, wherein the catch band is tightly connected on a first end to the second part or to a connecting element formed on the second part.

8. The side paneling system according to claim 7, wherein on the first part of the side paneling part a ramp for guiding the movement direction of the airbag during activation is formed.

9. The side paneling system according to claim 8, wherein at least one of the first part and the second part is at least partially composed of plastic.

10. The side paneling system according to claim 1, wherein the first part is a lower part and the second part is an upper part.

11. The side paneling system according to claim 1, wherein at least one non-releasable connecting element is selected from the group comprising a screw and a riveting element.

12. The side paneling system according to claim 1, wherein at least one of the at least one connecting element and the panel connecting element is at least partially composed of plastic.

13. A method for producing a motor vehicle, comprising:
making available a side paneling system, the side paneling system including a side paneling part that covers the pillar and an airbag arranged between the side paneling part and the pillar, at least one connecting element that releasably connects the side paneling part to the pillar, so that upon an activation of the airbag the side paneling part with the airbag moves away from the pillar, and a catch band coupled to the side paneling part, so that the side paneling part even with the airbag activated and the released connecting element is coupled to the pillar with the catch band; and
fastening the side paneling system to a vehicle structure.

14. The method according to claim 13, wherein the side paneling part includes a first part and a second part, and the first part and second part of the side paneling part prior to the fastening of the side paneling system to the vehicle structure are already interconnected with a panel connecting element so that the first part and second part of the side paneling part already connected with the panel connecting element are connected to the vehicle structure.

15. The method according to claim 14, wherein the first part is directly coupled to the vehicle structure with at least one connecting element and the second part is directly coupled to the vehicle structure with at least a second connecting element.

16. The method according to claim 13, wherein the vehicle structure is an A or C-pillar.

17. A motor vehicle, comprising:
a vehicle structure having at least one pillar;
at least one side paneling system coupled to the at least one pillar, the side paneling system including a side paneling part that covers the pillar and an airbag arranged between the side paneling part and the pillar, at least one connecting element that releasably connects the side paneling part to the pillar, so that upon an activation of the airbag the side paneling part with the airbag moves away from the pillar, and a catch band coupled to the side paneling part, so that the side paneling part even with the airbag activated and the released connecting element is coupled to the pillar with the catch band,
wherein the side paneling part is in two parts with a first part and a second part, so that only the second part with the airbag moves away from the pillar.

18. The motor vehicle according to claim 17, wherein the at least one pillar is an A or C-pillar and the pillar further comprises a body in the region of the pillar, and the airbag is a head airbag and between the second part of the side paneling part and the pillar the airbag is arranged, and between the first part of the side paneling part and the pillar, no airbag is arranged.

19. The motor vehicle according to claim 18, wherein the catch band with a second end is coupled to the at least one pillar, and the second part is coupled exclusively with the at least one releasable connecting element to the at least one pillar and the first part is coupled to the vehicle structure with the at least one releasable connecting element or non-releasable connecting element.

20. The motor vehicle according to claim 19, wherein after the activation of the airbag the second part is coupled to the at least one pillar only with the catch band.

* * * * *